United States Patent
Basak et al.

(10) Patent No.: US 10,404,309 B2
(45) Date of Patent: Sep. 3, 2019

(54) MOBILE DEVICE WITH USER-OPERABLE COVER FOR EXPOSING THERMALLY CONDUCTIVE PANEL

(71) Applicant: Intel Corporation, Santa Clara, CA (US)

(72) Inventors: Sankarananda Basak, Campbell, CA (US); Joshua Een, Portland, OR (US); David W. Browning, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/278,799

(22) Filed: Sep. 28, 2016

(65) Prior Publication Data

US 2018/0091183 A1    Mar. 29, 2018

(51) Int. Cl.
*H04M 1/00* (2006.01)
*H04B 1/3888* (2015.01)
*H04M 1/02* (2006.01)

(52) U.S. Cl.
CPC ........ *H04B 1/3888* (2013.01); *H04M 1/0235* (2013.01); *H04M 1/0202* (2013.01)

(58) Field of Classification Search
CPC .. H04B 1/3888; H04M 1/0202; H04M 1/0235
USPC ........... 455/575.1, 575.4; 361/679.41–679.6
See application file for complete search history.

(56) References Cited

U.S. PATENT DOCUMENTS

| | | | |
|---|---|---|---|
| 7,417,863 B2* | 8/2008 | Park | H05K 7/20445 165/80.2 |
| 8,982,560 B2* | 3/2015 | MacDonald | G06F 1/203 165/104.26 |
| 9,020,428 B2* | 4/2015 | Meunier | H04N 5/23229 455/41.1 |
| 9,608,686 B1* | 3/2017 | Coulter | H04B 1/3888 |
| 2001/0040788 A1 | 11/2001 | O'Connor et al. | |
| 2005/0176471 A1* | 8/2005 | Masuda | H04M 1/0237 455/566 |
| 2006/0148544 A1* | 7/2006 | Kim | G06F 1/1616 455/575.4 |
| 2006/0191894 A1 | 8/2006 | Usui et al. | |
| 2006/0198101 A1* | 9/2006 | Cho | G06F 1/1616 361/679.46 |

(Continued)

FOREIGN PATENT DOCUMENTS

JP    2009-194178 A    8/2009

OTHER PUBLICATIONS

International Search Report and Written Opinion, dated Oct. 31, 2017, issued in related International Application No. PCT/US2017/048474, 14 pages.

*Primary Examiner* — Edward F Urban
*Assistant Examiner* — Rui M Hu
(74) *Attorney, Agent, or Firm* — Schwabe, Williamson & Wyatt, P.C.

(57) ABSTRACT

A mobile device may include circuitry, a thermally-conductive panel in thermal communication with the circuitry, and a housing with a user-operable thermal access cover that has a closed position to cover the thermally-conductive panel and an open position to expose the thermally-conductive panel. Embodiments may include a dock with which the mobile device may be engaged, wherein the dock may include a thermal transfer device to engage the thermally-conductive panel of the mobile device.

13 Claims, 6 Drawing Sheets

(56) References Cited

U.S. PATENT DOCUMENTS

| | | | |
|---|---|---|---|
| 2006/0274506 A1* | 12/2006 | Huang | H04B 1/036 |
| | | | 361/704 |
| 2009/0137290 A1* | 5/2009 | Overmann | H05K 7/20436 |
| | | | 455/575.1 |
| 2009/0215508 A1 | 8/2009 | Huang et al. | |
| 2012/0011293 A1 | 1/2012 | Cheng et al. | |
| 2013/0027886 A1* | 1/2013 | Crooijmans | G06F 1/203 |
| | | | 361/704 |
| 2013/0148833 A1* | 6/2013 | Endo | G06F 1/206 |
| | | | 381/332 |
| 2013/0250504 A1* | 9/2013 | Choi | G06F 1/203 |
| | | | 361/679.26 |
| 2013/0319640 A1* | 12/2013 | Cavallaro | F28F 7/00 |
| | | | 165/121 |
| 2014/0098486 A1 | 4/2014 | Davis | |
| 2015/0018053 A1* | 1/2015 | Chou | G06F 1/203 |
| | | | 455/575.1 |
| 2015/0192971 A1* | 7/2015 | Shah | G06F 1/203 |
| | | | 361/679.41 |
| 2016/0154443 A1* | 6/2016 | Tudosoiu | G06F 1/203 |
| | | | 455/575.1 |
| 2017/0290194 A1* | 10/2017 | Mittal | H05K 7/2039 |

\* cited by examiner

US 10,404,309 B2

MOBILE DEVICE WITH USER-OPERABLE COVER FOR EXPOSING THERMALLY CONDUCTIVE PANEL

TECHNICAL FIELD

The present disclosure relates generally to mobile devices and more particularly to mobile devices with user-operable cover for exposing thermally-conductive panel for cooling such devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Electronic circuitry in mobile devices, such as mobile telephones, tablet computers, "phablets," wearable devices such as smart watches, etc., typically includes a central processing integrated circuit (IC) component that performs a majority of electronic processing for the device and, therefore, generates a greater amount of heat. In some embodiments, a heat spreader or "slug," may be positioned in thermal contact with the central processing IC component. The heat spreader may be a flat metal plate, generally about the planar size of the central processing IC component, to distribute across the extent of the heat spreader heat from one or more localized hotspots on the central processing IC component. The heat spreader may normalize the temperature across the surface of the central processing IC component and so may allow it to operate in a higher-performance, higher-power mode for a longer period of time before performance throttling is necessary to reduce the temperature of the central processing IC component.

DETAILED DESCRIPTION

Figure 1A:
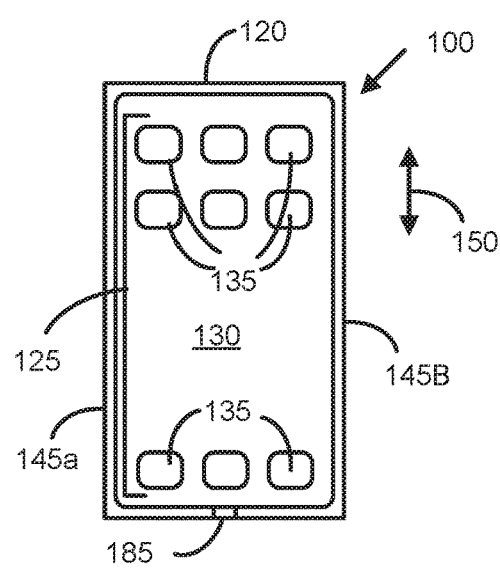
FIGS. 1A and 1B illustrate respective front and schematic sectional side views of a mobile device according to some embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1B:
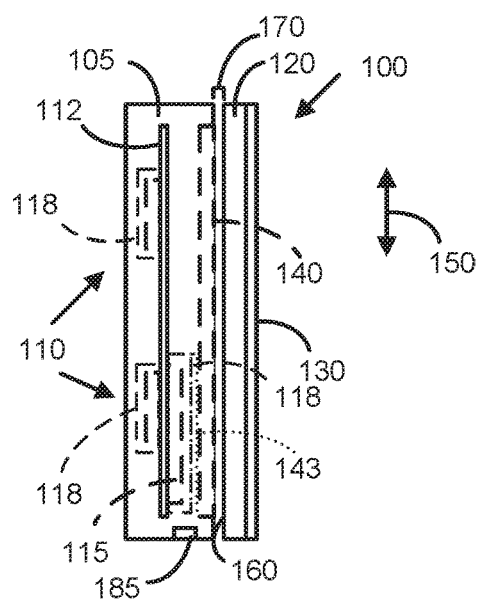

FIGS. 1A and 1B illustrate respective front and schematic sectional side views of a mobile device 100 according to some embodiments. Mobile device 100 may include within a case base 105 electronic circuitry 110, which may be mounted on a circuit board 112 and may include a central processing integrated circuit (IC) component 115 that may perform a majority or substantial amount of electronic processing for the device, as described below. One or more shield cans 118 may encompass electronic circuitry 110, or portions of it, and may provide electromagnetic shielding and/or heat spreading. Mobile device 100 may include a case top 120. In embodiments, case top 120 may support and/or contain a display 125 under a transparent (e.g., glass) face 130, which together may operate as a touchscreen that may include one or more graphical user inputs 135 (e.g., icons).

A thermally-conductive heat spreader panel 140 may be supported, mounted, and/or contained in case base 105 in thermal communication with at least a portion of the electronic circuitry 110. In embodiments, heat spreader panel 140 may be in thermal communication with central processing IC component 115. Heat spreader panel 140 may be of or include a thermally-conductive material. In embodiments, heat spreader panel 140 may be of or include any of a variety of thermally-conductive materials, including metals (e.g., aluminum, copper, magnesium, etc.), conductive plastics, graphite, graphene, doped plastic, etc. Heat spreader panel 140 may be in direct thermal contact with central processing IC component 115 or, in embodiments, may be in thermal communication with central processing IC component 115 via a thermally-conductive gap filler 143. In embodiments, gap filler 143 may include thermal grease. Mobile device 100 may optionally and/or alternatively include one or more separate keys (not shown) that may be distinct from and operable separate from touchscreen operation of display 125.

Figure 2A:
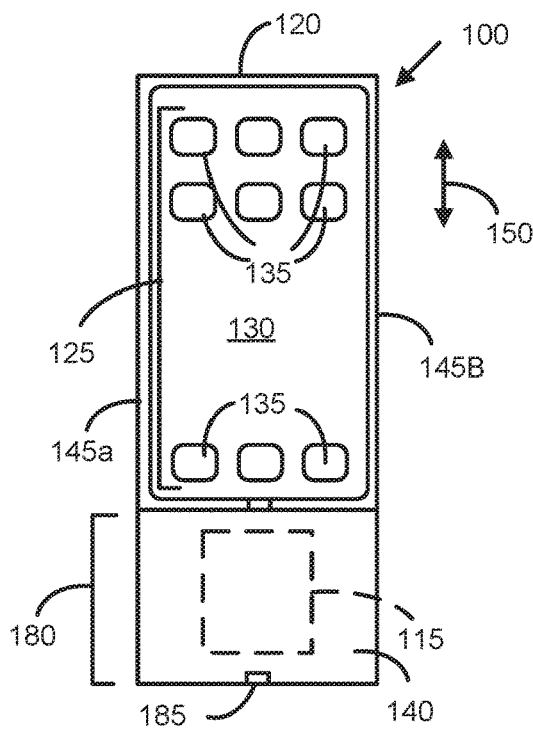
FIGS. 2A and 2B illustrate respective front and schematic sectional side views of the mobile device of FIGS. 1A and 1B in an open position.
Figure 2B:
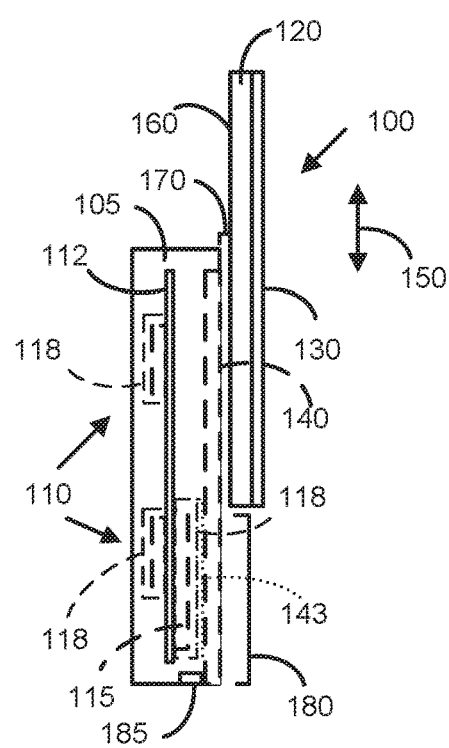

In embodiments, case top 120 may engage case base 105 along opposed sides 145a and 145b to allow user-operated linear (e.g., sliding) movement between case top 120 and case base 105 in directions 150. For example, one of case base 105 and case top 120 may include a linear groove or track along each of sides 145a and 145b, and the other of case base 105 and case top 120 may include one or more guides that may fit within and move along the linear grooves or tracks. FIGS. 1A and 1B show mobile device 100 in a closed position in which case top 120 may be positioned over substantially all of case base 105. In the closed position, heat spreader panel 140 may be in face-to-face relation to an inner surface 160 of case top 120. FIGS. 2A and 2B illustrate respective front and schematic sectional side views of mobile device 100 and show mobile device 100 in an open position, in which case top 120 may be positioned to uncover or expose at least an exposed portion 180 of heat spreader panel 140. Thus, case top 120 may also be referred to as case cover 120, or slidable case top/cover 120. Mobile device may further include one or more device electrical connections 185 which may be for data and/or power, etc.

In embodiments, case base 105 and case top 120 may fit together in the closed position to provide a spacing, separation, or air gap 170 between heat spreader panel 140 and inner surface 160. In the closed position of FIGS. 1A and 1B, heat spreader panel 140 may facilitate passive cooling of mobile device 100. For example, with mobile device 100 in the closed position, heat from electronic circuitry 110, including central processing IC component 115, may be transferred by heat spreader panel 140 to air gap 170. Air within air gap 170 may get warmer, and lighter, and may move through air gap 170 so that cooler ambient air may move into airgap 170. The resulting airflow, also known as natural convection, may operate to cool mobile device 100. With conductive heat spreader panel 140 supported, mounted, and/or contained in case base 105, electronic circuitry 110 may be sealed or substantially sealed within case base 105 to provide increased protection against environmental contaminants, such as particles and water, and also may be provided cooling as described above. As a result, heat spreader panel 140 in embodiments provide device 100 with increased durability and performance. Heat spreader panel 140 may also facilitate cooling of mobile device 100 when it is in the open position of FIGS. 2A and 2B, in which exposed portion 180 may be open to ambient air.

Figure 3:
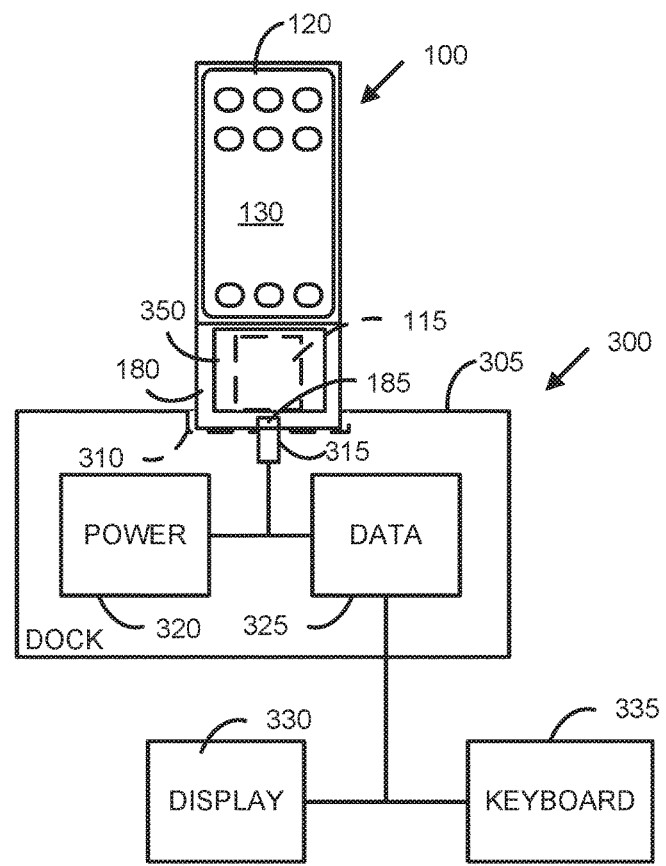
FIG. 3 is a combined schematic and block diagram illustrating an embodiment with a mobile device coupled to and/or engaged with a dock.

FIG. 3 is a combined schematic and block diagram illustrating an embodiment with mobile device 100 coupled to and/or engaged with a dock 300, which may facilitate powering and computational use of mobile device 100. Dock 300 may include dock base 305 with a socket 310 to receive and provide support to mobile device 100. Dock 300 may also include one or more dock electrical connections 315 to provide one or more couplings to the one or more device electrical connections 185. In embodiments, dock electrical connections 315 and device electrical connections 185 may provide to mobile device 100 power from a dock power supply 320 and/or may provide data communication between mobile device 100 and a dock data system 325. In some embodiments, dock data system 325 may optionally be coupled to a display 330 and/or a keyboard 335 that may facilitate user interaction with and use of mobile device 100 as a computing or computer device. In addition, dock 300 may include a thermal transfer device 350, which may thermally engage exposed portion 180 of heat spreader panel 140 (FIGS. 2A, 2B) and may facilitate cooling of mobile device 100. In embodiments, thermal transfer device 350 may include any of a heatsink and/or a fan, water cooling, or thermo-electric cooling, etc.

Figure 4:
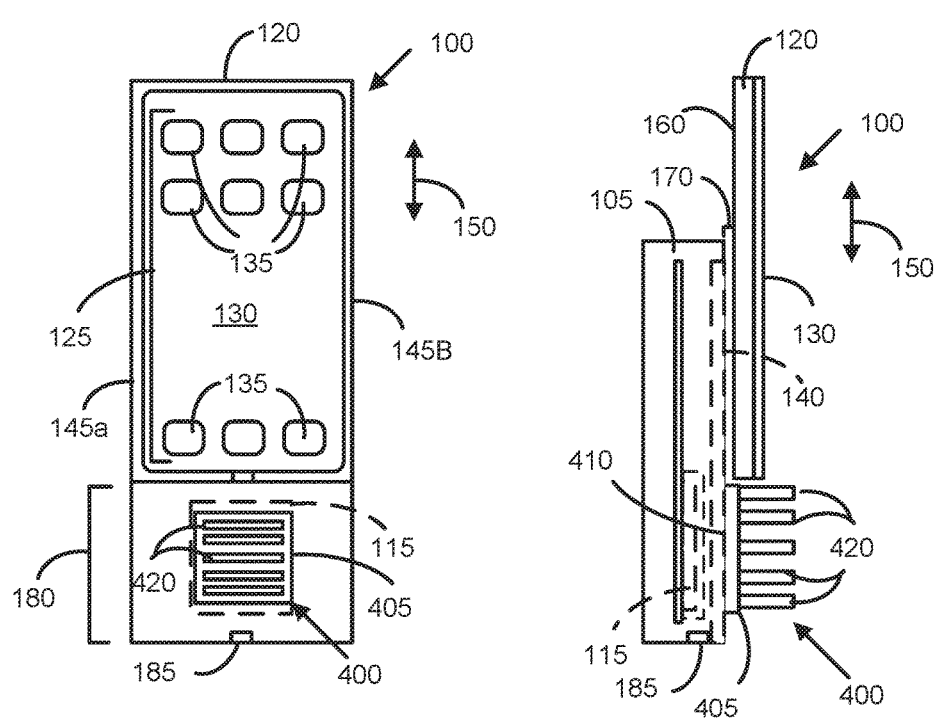
FIGS. 4A and 4B are respective front and side view illustrations of one example embodiment of a dock thermal transfer device that may include a convective heat sink.

FIGS. 4A and 4B are respective front and side view illustrations of one example embodiment of a convective heat sink 400, which may operate as thermal transfer device 350 of dock 300 to engage exposed portion 180 of heat spreader panel 140 and facilitate cooling of mobile device 100, such as when it is in dock 300. In embodiments convective heat sink 400 may include a thermally-conductive heat transfer base 405 with a heat transfer surface 410 that may be positioned in face-to-face relation to, and in physical contact with, exposed portion 180 of heat spreader panel 140.

Convective heat sink 400 may also include one or more heat-radiating fins, vanes or arms 420 that may extend away from base 405. In embodiments, fins 420 may extend substantially perpendicular away from base 405, and/or may extend away from base 405 in other directions. Also, fins 420 may be of generally arbitrary configurations that may provide an increased surface area that may facilitate transfer of heat from exposed portion 180 of heat spreader panel 140 of mobile device 100. In embodiments, dock 300 with convective heat sink 400 operating as thermal transfer device 350 may include a magnet and/or a spring bias to provide effective thermal contact between heat sink 400 and exposed portion 180 of heat spreader panel 140. In embodiments, dock 300 may support convective heat sink 400 with a universal joint, such as a ball and socket joint, to facilitate alignment and engagement between heat sink 400 and exposed portion 180 of heat spreader panel 140.

Figure 5:
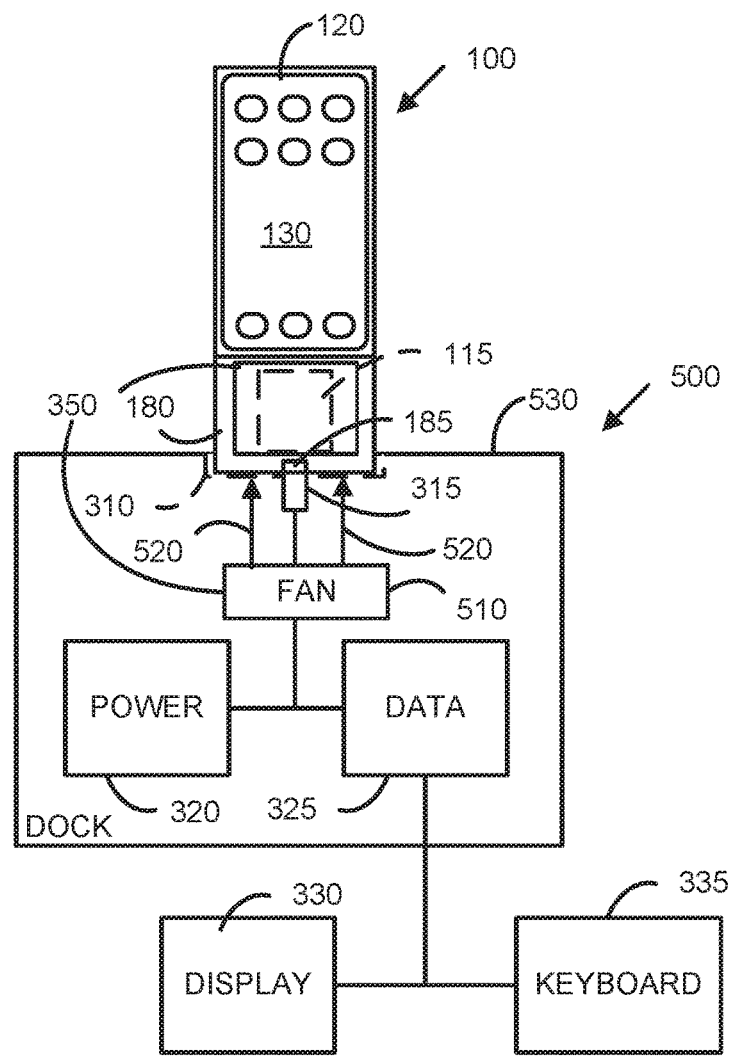
FIG. 5 is a combined schematic and block diagram illustrating a mobile device coupled to and/or engaged with another embodiment of a dock.

FIG. 5 is a combined schematic and block diagram illustrating an embodiment with mobile device 100 coupled to a dock 500 in which thermal transfer device 350 of FIG. 3 may include a fan 510 that may provide an air flow 520 that engage exposed portion 180 of heat spreader panel 140 and facilitate cooling of mobile device 100 when it is in dock 500. As illustrated, dock 500 may otherwise include components substantially the same as dock 300. It will be appreciated that, in embodiments, thermal transfer device 350 may include fan 510 to provide air flow 520 that may engage exposed portion 180 of heat spreader panel 140 or may include fan 510 in combination with convective heat sink 400. Fan 510 may be located within a dock base 530 to provide air flow 520 to exposed portion 180 by ducts and/or vents. In other embodiments, fan 510 may be located generally in front of exposed portion 180 of heat spreader panel 140 to provide a direct air flow 520. It will be appreciated that fan 510, as well as thermo-electric cooling, either alone or in combination with a heat sink, may function as powered, active cooling of exposed portion 180 of heat spreader panel 140 and, thereby, powered, active cooling of device 100.

A central processing IC component of a mobile device may expend a significant portion (e.g., about half) of the overall power used by the device, including power for the central processing IC component, as well as memory, storage, power management, display, etc. Computational performance of some mobile devices may be limited in part by thermal considerations that may arise from higher-performance or sustained data processing. Sustained higher-performance operation and/or data processing of a device may lead to damage of the device, including the central processing IC component, and/or may lead to a device being too hot for a user to handle comfortably. As a consequence, device performance may be limited to prevent overheating that may cause device damage and/or uncomfortable temperatures for user handling.

An aspect of mobile device 100 and heat spreader panel 140 is that they may provide improved device cooling with the device in the open and the closed positions. Moreover, device 100 in combination with a dock, such as dock 300 or dock 500, may provide increased cooling so that mobile device may be operated at a higher level of performance for a longer duration without the typical risk of damage from overheating. As an illustration of one example embodiment, a mobile device such as a tablet may provide sustained operation in a closed position with about 6.3 W of overall power and about 3.4 W of power for a central processing IC component, whereas the device may provide sustained operation in an open position, while docked, with about 23 W of overall power and about 13.1 W of power for a central processing IC component. As another illustration of one example embodiment, a mobile device may provide sustained operation in a closed position with about 7.4 W of overall power and about 4.1 W of power for a central processing IC component, whereas the device may provide sustained operation in an open position, while docked, with about 17.4 W of overall power and about 10.2 W of power for a central processing IC component. In embodiments, the higher-performance and/or sustained data processing the devices in the open position, while docked, may correspond to personal computer levels of computational performance and may significantly exceed performance capabilities of other mobile devices.

Figure 6:
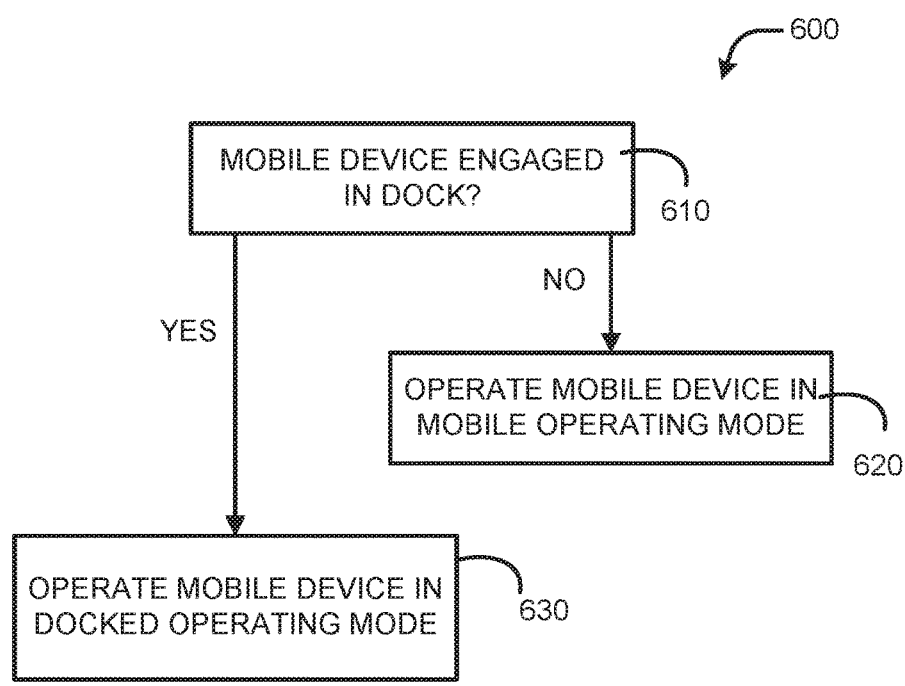
FIG. 6 is a flow diagram of a method of selecting an operational state of a mobile device.

FIG. 6 is a flow diagram of a method 600 of selecting an operational state of a mobile device. In embodiments, the mobile device may include a thermally-conductive heat spreader panel that may be supported, mounted, and/or contained in case base in thermal communication with at least a portion of electronic circuitry of the device. In an embodiment, the operations of method 600 may be performed by a central processing IC component of the mobile device. Mobile device 100 may be an example of such a mobile device.

At 610, a determination may be made whether the mobile device is engaged in a dock, which may be referred to as being docked. In embodiments, being docked may include the thermally-conductive heat spreader panel of the mobile device being in engagement with a thermal transfer device of the dock. The thermal transfer device may or may not provide powered active cooling. If the mobile mode is not docked, operation 620 may follow. If the mobile device is docked, operation 630 may follow.

At 620, the mobile device is operated in a mobile operating mode that may, among other things, operate the mobile device at a mobile operating power.

At 630, the mobile device is operated in a docked operating mode that may, among other things, operate the mobile device at a docked operating power that may be greater than the mobile operating power. In embodiments, the docked operating mode may allow the mobile device to be operated at higher sustained data and/or graphics processing rates, which may entail greater operating power, relative to the graphics and/or data processing rates at which the mobile device can sustainably be operated in undocked or mobile operation. In embodiments, the higher-performance data and/or graphics processing of the mobile device in the docked operating mode may correspond to personal computer levels of computational performance and may significantly exceed performance capabilities of undocked mobile devices.

Figure 7:
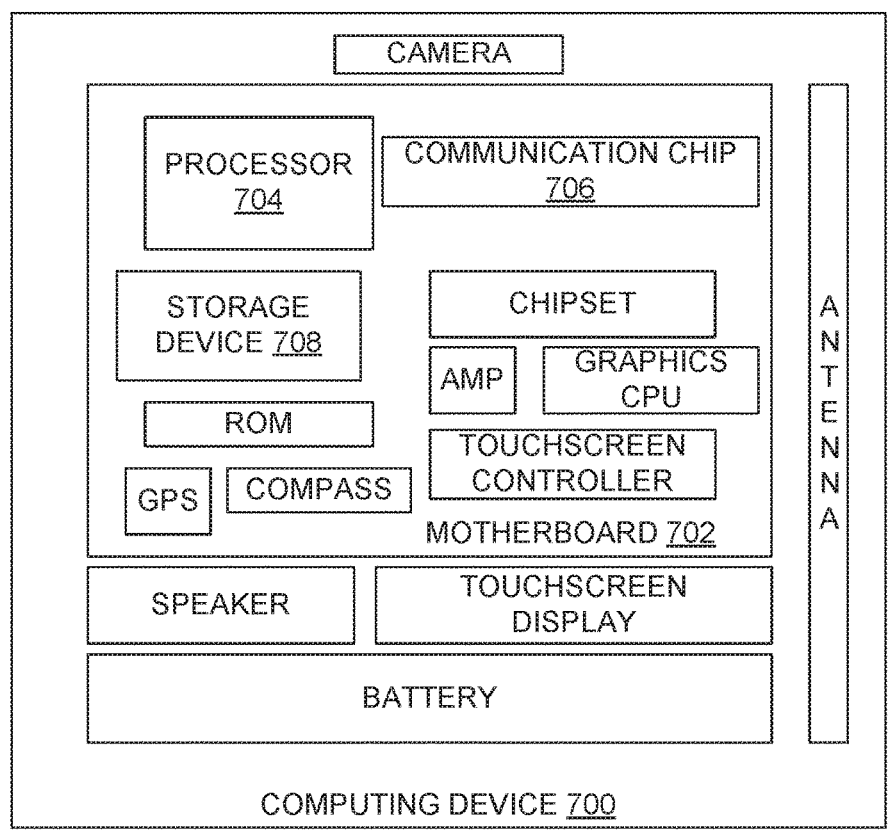
FIG. 7 schematically illustrates a mobile device which, in accordance with some embodiments, may include one or more of a mobile device of FIGS. 1A, 1B, 2A, and/or 2B.

FIG. 7 schematically illustrates a computing device 600 which, in accordance with some embodiments, may include one or more of a mobile device 100. In embodiments, central processing IC component 115 of device 100 may include one or more elements the computing device 700, such as a processor 704.

The computing device 700 may be, for example, a mobile communication device. The computing device 700 may house a board such as a motherboard 702. The motherboard 702 may include a number of components, including (but not limited to) a processor 704 and at least one communication chip 706. Any of the components discussed herein with reference to the computing device 700 may be arranged in or thermally coupled with an exposable thermally-conductive panel, as described earlier. In further implementations, the communication chip 706 may be part of the processor 704.

The computing device 700 may include a storage device 708. In some embodiments, the storage device 708 may include one or more solid state drives. Examples of storage devices that may be included in the storage device 708 include volatile memory (e.g., dynamic random access memory (DRAM)), non-volatile memory (e.g., read-only memory, ROM), flash memory, and mass storage devices (such as hard disk drives, compact discs (CDs), digital versatile discs (DVDs), and so forth).

Depending on its applications, the computing device 700 may include other components that may or may not be physically and electrically coupled to the motherboard 702. These other components may include, but are not limited to, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, a Geiger counter, an accelerometer, a gyroscope, a speaker, and a camera.

The communication chip 706 and the antenna may enable wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible broadband wide region (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 706 may operate in accordance with a Global System for Mobile Communications (GSM), General Packet Radio Service (GPRS), Universal Mobile Telecommunications System (UMTS), High Speed Packet Access (HSPA), Evolved HSPA (E-HSPA), or LTE network. The communication chip 706 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 706 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 706 may operate in accordance with other wireless protocols in other embodiments.

The computing device 700 may include a plurality of communication chips 706. For instance, a first communication chip 706 may be dedicated to shorter range wireless communications such as Wi-Fi and Bluetooth, and a second communication chip 706 may be dedicated to longer range wireless communications such as GPS, EDGE, GPRS, CDMA, WiMAX, LTE, EV-DO, and others. In some embodiments, the communication chip 706 may support wired communications. For example, the computing device 700 may include one or more wired servers.

The processor 704 and/or the communication chip 706 of the computing device 700 may include one or more dies or other components in an IC package. Such an IC package may be coupled with an interposer or another package using any of the techniques disclosed herein. The term "processor" may refer to any device or portion of a device that processes electronic data from registers and/or memory to transform that electronic data into other electronic data that may be stored in registers and/or memory.

In various implementations, the computing device 700 may be a wearable device, a laptop, a netbook, a notebook, an ultrabook, a smartphone, a tablet, a personal digital assistant (PDA), an ultra mobile PC, a mobile phone, a digital camera, a portable music player, or a digital video recorder. In further implementations, the computing device 700 may be any other electronic device that processes data.

Thus various example embodiments of the present disclosure have been described including, but are not limited to:

Example 1 my include mobile device, which may comprise circuitry, a thermally-conductive panel in thermal communication with the circuitry, and a housing with a user-operable thermal access cover that has a closed position to cover the thermally-conductive panel and an open position to expose the thermally-conductive panel.

Example 2 may include the device of example 1 wherein the circuitry may include a processor, and a first region of the thermally-conductive panel is in thermal communication with the processor and the thermal access cover in the open position may provide exposure to the first region.

Example 3 may include the device of example 1 wherein the mobile device may mate with a dock that may include a thermal transfer device to engage the thermally-conductive panel with the thermal access cover in the open position.

Example 4 may include the device of example 3 wherein the thermally-conductive panel, with the thermal access cover in the open position, may make contact with a contact surface of the thermal transfer device.

Example 5 may include the device of example 4 wherein the thermal transfer device may include a convective heat sink.

Example 6 may include the device of example 3 wherein the thermal transfer device may provide powered, active cooling of the thermally-conductive panel.

Example 7 may include the device of example 3 wherein the circuitry may comprise a processor operable in first and second operating modes, wherein the first operating mode may include a first sustained power usage, the second operating mode may include a second sustained power usage, and the first sustained power usage may be greater than the second sustained power usage, and wherein the mobile device may operate in the first operating mode when the thermal transfer device engages the thermally-conductive panel with the thermal access cover in the open position, and wherein the mobile device may otherwise operate in the second operating mode.

Example 8 may include the device of example 1 wherein the thermal access cover may be operable along a slide track to move between the open position and the closed position.

Example 9 may include the device of example 1 wherein the mobile device may have planar internal dimensions within the housing and the thermally-conductive panel may have planar dimensions substantially equal to the planar internal dimensions of the housing.

Example 10 may include a system, which may comprise a mobile device that may include a processor, a thermally-conductive panel with a first region in thermal communication with the processor, a housing with a user-operable thermal access cover that has a closed position to cover the thermally-conductive panel and an open position to expose to the thermally-conductive panel, including the first region, and wherein the mobile device may include one or more device electrical connections; and a dock that may include one or more dock electrical connections that may provide one or more couplings to the one or more device electrical connections, and a thermal transfer device to engage the first region of thermally-conductive panel with the thermal access cover in the open position.

Example 11 may include the system of example 10 wherein the thermal transfer device may include a contact surface that may be positioned to make contact with the first region of the thermally-conductive panel when the thermal access cover is in the open position.

Example 12 may include the system of example 11 wherein the thermal transfer device may include a convective heat sink.

Example 13 may include the system of example 10 wherein the thermal transfer device may provide powered, active cooling.

Example 14 may include the system of example 13 wherein the powered, active cooling may employ a fan.

Example 15 may include the system of example 13 wherein the powered, active cooling may employ thermoelectric cooling.

Example 16 may include the system of example 10 wherein the processor may be operable in first and second operating modes, wherein the first operating mode may include a first sustained power usage, the second operating mode may include a second sustained power usage, and the first sustained power usage may be greater than the second sustained power usage, and wherein the mobile device may operate in the first operating mode when the dock provides the one or more couplings to the one or more device electrical connections of the mobile device and the thermal transfer device may engage the first region of the thermally-conductive panel with the thermal access cover in the open position.

Example 17 may include the system of example 10 wherein the thermal access cover may be operable along a slide track to move between the open position and the closed position.

Example 18 may include the system of example 13 wherein the powered, active cooling may employ a fan.

Example 19 may include the system of example 13 wherein the powered, active cooling may employ thermoelectric cooling.

Example 20 may include a system, which may comprise a mobile device that may include circuitry, including a memory to store executable instructions and a processor to execute the executable instructions, one or more device electrical connections, and heat access means to selectively provide exposure to heat generated by the circuitry; and a dock to engage the mobile device, wherein the dock may include one or more dock electrical connections that may provide one or more couplings to the one or more device electrical connections and heat transfer means to operate with the heat access means to transfer from the mobile device heat generated by the circuitry.

Example 21 may include the system of example 20 and may further include operating mode means to operate the mobile device in one of first and second operating modes according to whether or not the mobile device is engaged with the dock, respectively, wherein the circuitry in the first operating mode may employ more power than in the second operating mode.

Example 22 may include the system of example 20 wherein the heat access means may include a thermally-conductive panel in thermal communication with the circuitry and an operable thermal access cover that has a closed position to cover the thermally-conductive panel and an open position to expose to the thermally-conductive panel.

Example 23 may include the system of example 22 wherein the heat transfer means may include a contact surface that may be positioned to make contact with the thermally-conductive panel when the thermal access cover is in the open position.

Example 24 may include the system of example 23 wherein the heat transfer means may include a convective heat sink.

Example 25 may include the system of example 22 wherein the thermal access cover may be operable along a slide track to move between the open position and the closed position.

Example 26 may include a mobile device, which may comprise circuitry, a thermally-conductive panel in thermal communication with the circuitry, and a housing with a user-operable thermal access cover that has a closed position to cover the thermally-conductive panel and an open position to expose the thermally-conductive panel.

Example 27 may include the device of example 26 wherein the circuitry may include a processor, and a first region of the thermally-conductive panel may be in thermal communication with the processor and the thermal access cover in the open position may provide exposure to the first region.

Example 28 may include the device of examples 26 or 27 wherein the mobile device may be to mate with a dock that includes a thermal transfer device to engage the thermally-conductive panel with the thermal access cover in the open position.

Example 29 may include the device of example 28 wherein the thermally-conductive panel, with the thermal access cover in the open position, may be to make contact with a contact surface of the thermal transfer device.

Example 30 may include the device of example 29 wherein the thermal transfer device may include a convective heat sink.

Example 31 may include the device of example 28 wherein the thermal transfer device may provide powered, active cooling of the thermally-conductive panel.

Example 32 may include the device of example 28 wherein the circuitry may comprise a processor operable in first and second operating modes, wherein the first operating mode may include a first sustained power usage, the second operating mode may include a second sustained power usage, and the first sustained power usage may be greater than the second sustained power usage, and wherein the mobile device may operate in the first operating mode when the thermal transfer device engages the thermally-conductive panel with the thermal access cover in the open position, and wherein the mobile device may otherwise operates in the second operating mode.

Example 33 may include the device of examples 26 or 27 wherein the thermal access cover may be operable along a slide track to move between the open position and the closed position.

Example 34 may include the device of example 26 wherein the mobile device has planar internal dimensions within the housing and the thermally-conductive panel may have planar dimensions substantially equal to the planar internal dimensions of the housing.

Example 35 may include a system, which may comprise a mobile device that may include a processor, a thermally-conductive panel with a first region in thermal communication with the processor, a housing with a user-operable thermal access cover that has a closed position to cover the thermally-conductive panel and an open position to expose to the thermally-conductive panel, including the first region, and wherein the mobile device may includes one or more device electrical connections; and a dock that may include one or more dock electrical connections to provide one or more couplings to the one or more device electrical connections, and a thermal transfer device to engage the first region of thermally-conductive panel with the thermal access cover in the open position.

Example 36 may include the system of example 35 wherein the thermal transfer device may include a contact surface that may be positioned to make contact with the first region of the thermally-conductive panel when the thermal access cover is in the open position.

Example 37 may include the system of example 36 wherein the thermal transfer device may include a convective heat sink.

Example 38 may include the system of example 35 wherein the thermal transfer device may provide powered, active cooling.

Example 39 may include the system of example 38 wherein the powered, active cooling may employ a fan.

Example 40 may include the system of example 38 wherein the powered, active cooling may employs thermoelectric cooling.

Example 41 may include the system of any of examples 35-40 wherein the processor may be operable in first and second operating modes, wherein the first operating mode may include a first sustained power usage, the second operating mode may include a second sustained power usage, and the first sustained power usage is greater than the second sustained power usage, and wherein the mobile device may operate in the first operating mode when the dock provides the one or more couplings to the one or more device electrical connections of the mobile device and the thermal transfer device engages the first region of the thermally-conductive panel with the thermal access cover in the open position.

Example 42 may include the system of any of examples 35-40 wherein the thermal access cover may be operable along a slide track to move between the open position and the closed position.

Example 43 may include the system of example 38 wherein the powered, active cooling may employ a fan.

Example 44 may include the system of example 38 wherein the powered, active cooling may employs thermo-electric cooling.

Example 45 may include a system, which may comprise a mobile device that may include circuitry, including a memory to store executable instructions and a processor to execute the executable instructions, one or more device electrical connections, and heat access means to selectively provide exposure to heat generated by the circuitry; and a dock to engage the mobile device, wherein the dock may include one or more dock electrical connections to provide one or more couplings to the one or more device electrical connections and heat transfer means to operate with the heat access means to transfer from the mobile device heat generated by the circuitry.

Example 46 may include the system of example 45 further and may further include operating mode means to operate the mobile device in one of first and second operating modes according to whether or not the mobile device is engaged with the dock, respectively, wherein the circuitry in the first operating mode may employ more power than in the second operating mode.

Example 47 may include the system of examples 45 or 46 wherein the heat access means may include a thermally-conductive panel in thermal communication with the circuitry and an operable thermal access cover that has a closed position to cover the thermally-conductive panel and an open position to expose to the thermally-conductive panel.

Example 48 may include the system of example 47 wherein the heat transfer means may include a contact surface that is positioned to make contact with the thermally-conductive panel when the thermal access cover is in the open position.

Example 49 may include the system of example 48 wherein the heat transfer means may include a convective heat sink.

Example 50 may include the system of example 47 wherein the thermal access cover is operable along a slide track to move between the open position and the closed position.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A system, comprising:
    a mobile device that includes a processor, a thermally-conductive panel with a first region in direct thermal contact or in thermal communication via a thermally conductive gap filler with the processor, a case base to house the processor and the thermally-conductive panel, and a case top to slidably couple with the case base in a closed position where the thermally-conductive panel is enclosed and not exposed to an ambient environment of the mobile device, and in an open position to at least partially expose the thermally-conductive panel, including the first region, to the ambient environment of the mobile device, and wherein the mobile device includes one or more device electrical connections; and
    a dock that includes one or more dock electrical connections to provide one or more couplings to the one or more device electrical connections, and a thermal transfer device to engage the first region of thermally-conductive panel with the case base and case top slidably coupled in the open position, in lieu of at least partially exposing the thermally-conductive panel, including the first region, to the ambient environment of the mobile device.

2. The system of claim 1, wherein the thermal transfer device includes a contact surface that is positioned to make contact with the first region of the thermally-conductive panel when the case base and case top are slidably coupled in the open position.

3. The system of claim 2, wherein the thermal transfer device includes a convective heat sink.

4. The system of claim 1, wherein the thermal transfer device provides powered, active cooling.

5. The system of claim 4, wherein the powered, active cooling employs a fan.

6. The system of claim 4, wherein the powered, active cooling employs thermo-electric cooling.

7. The system of claim 1, wherein the processor is operable in first and second operating modes, wherein the first operating mode includes a first sustained power usage, the second operating mode includes a second sustained power usage, and the first sustained power usage is greater than the second sustained power usage, and wherein the mobile device operates in the first operating mode when the dock provides the one or more couplings to the one or more device electrical connections of the mobile device and the thermal transfer device engages the first region of the thermally-conductive panel with the case base and case top slidably coupled in the open position.

8. The system of claim 1, wherein the case base and case top are slidably coupled via a slide track to move between the open position and the closed position.

9. A system, comprising:
    a mobile device that includes circuitry, including a memory to store executable instructions and a processor to execute the executable instructions, one or more device electrical connections, and heat spread means to selectively dissipate heat generated by the circuitry; wherein the heat spread means include a heat spreader panel where at least a portion of the heat spreader panel is in direct thermal contact or in thermal communication via a thermally conductive gap filler with the circuitry, wherein the mobile device further includes a case base to house the circuitry, the one or more device electrical connections and the heat spread means, and a case top to slidably couple with the case base in a closed position to enclose and not expose the heat spreader panel to an ambient environment of the mobile device, and in an open position that at least partially exposed the heat spreader panel to the ambient environment of the mobile device; and
    a dock to engage the mobile device, wherein the dock includes one or more dock electrical connections to provide one or more couplings to the one or more device electrical connections and heat transfer means to engage with the heat spreader panel in lieu of exposing the heat spreader panel to the ambient environment of the mobile device, and to operate with the heat spreader panel to transfer from the mobile device heat generated by the circuitry.

10. The system of claim 9, further including operating mode means to operate the mobile device in one of first and second operating modes according to whether or not the mobile device is engaged with the dock, respectively, wherein the circuitry in the first operating mode employs more power than in the second operating mode.

11. The system of claim 9, wherein the heat transfer means further includes a contact surface that is positioned to make contact with a thermally-conductive panel when the case base and the case top are slidably coupled in the open position.

12. The system of claim 11, wherein the heat transfer means includes a convective heat sink.

13. The system of claim 9, wherein the case base and the case top are slidably coupled via a slide track to move between the open position and the closed position.

* * * * *